US009439056B2

(12) United States Patent
Chukka et al.

(10) Patent No.: US 9,439,056 B2
(45) Date of Patent: Sep. 6, 2016

(54) SECURE SHARING OF DEVICE VOICE AND DATA SERVICES WITH FEE BASED POLICIES

(75) Inventors: Ravikiran Chukka, Beaverton, OR (US); Gyan Prakash, Beaverton, OR (US); Rajesh Poornachandran, Portland, OR (US); Saurabh Dadu, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/977,856

(22) PCT Filed: Apr. 9, 2012

(86) PCT No.: PCT/US2012/032685
§ 371 (c)(1),
(2), (4) Date: Dec. 5, 2014

(87) PCT Pub. No.: WO2013/154517
PCT Pub. Date: Oct. 17, 2013

(65) Prior Publication Data
US 2015/0296362 A1    Oct. 15, 2015

(51) Int. Cl.
*H04W 4/24* (2009.01)
*G06Q 20/32* (2012.01)
*G06Q 20/34* (2012.01)
(Continued)

(52) U.S. Cl.
CPC ............. *H04W 4/24* (2013.01); *G06Q 20/325* (2013.01); *G06Q 20/3227* (2013.01); *G06Q 20/3278* (2013.01); *G06Q 20/352* (2013.01); *G06Q 20/4012* (2013.01); *H04M 15/64* (2013.01); *H04M 15/67* (2013.01);
(Continued)

(58) Field of Classification Search
CPC ....... G06F 21/31; G06F 21/41; H04L 63/08; H04L 63/10; H04M 1/575; H04M 1/7253; H04M 2250/04; H04M 3/42042; H04M 3/42059; H04M 3/42246
See application file for complete search history.

(56) References Cited

U.S. PATENT DOCUMENTS 8,078,528 B1    12/2011  Vicente et al.
2007/0244808 A1*  10/2007  Eze ..................... G06Q 40/025
                                                          705/38
(Continued)

FOREIGN PATENT DOCUMENTS

TW    200636529          10/2006
TW    200945866  A       11/2009
(Continued)

OTHER PUBLICATIONS

International Preliminary Report on Patentability received for PCT Patent Application No. PCT/US2012/032685, mailed on Oct. 23, 2014, 9 pages.

(Continued)

*Primary Examiner* — Matthew Sams
(74) *Attorney, Agent, or Firm* — Jordan IP Law, LLC

(57) ABSTRACT

Methods and systems may provide for conducting an authentication of an external card associated with a borrower of a device, and tracking a usage of the device by the borrower if the authentication of the external card is successful. In addition, the usage may be reported to a billing service. The usage may be billed according to a fee based policy so that payment for the usage may be obtained from the borrower of the device rather than the owner of the device.

4 Claims, 2 Drawing Sheets

(51) Int. Cl.
*G06Q 20/40* (2012.01)
*H04M 15/00* (2006.01)
*H04W 12/06* (2009.01)

(52) U.S. Cl.
CPC ......... *H04M 15/774* (2013.01); *H04M 15/78* (2013.01); *H04M 15/93* (2013.01); *H04W 12/06* (2013.01)

(56) References Cited

U.S. PATENT DOCUMENTS

| | | |
|---|---|---|
| 2008/0227471 A1 | 9/2008 | Dankar et al. |
| 2011/0246369 A1 | 10/2011 | de Oliveira et al. |
| 2011/0302630 A1* | 12/2011 | Nair ................ G06F 21/41 726/4 |
| 2013/0178198 A1* | 7/2013 | Hill .................. H04M 1/575 455/415 |

FOREIGN PATENT DOCUMENTS

| | | |
|---|---|---|
| TW | 201023066 A | 6/2010 |
| WO | 2013/154517 A1 | 10/2013 |
| WO | 2013154517 A1 | 10/2013 |

OTHER PUBLICATIONS

International Search Report and Written Opinion received for PCT Application No. PCT/US2012/032685, mailed on Aug. 7, 2013, 12 pages.

Office Action for Taiwanese Patent Application No. 102112377, dated Dec. 25, 2014, 14 pages including 7 pages of English translation.

* cited by examiner

SECURE SHARING OF DEVICE VOICE AND DATA SERVICES WITH FEE BASED POLICIES

BACKGROUND

1. Technical Field

Embodiments generally relate to the sharing of device voice and data services. More particularly, embodiments relate to the use of secure fee based policies to share device voice and data services.

2. Discussion

Conventionally, an individual needing to place a telephone call may use his or her personal mobile phone, a landline or an Internet based connection. If none of these options are available, the individual may resort to borrowing the mobile phone of another individual in order to place the call. Such an approach, however, may lead to a reduction in the number of minutes available to the owner of the phone, and may even result in extra usage fees being assessed on the owner.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
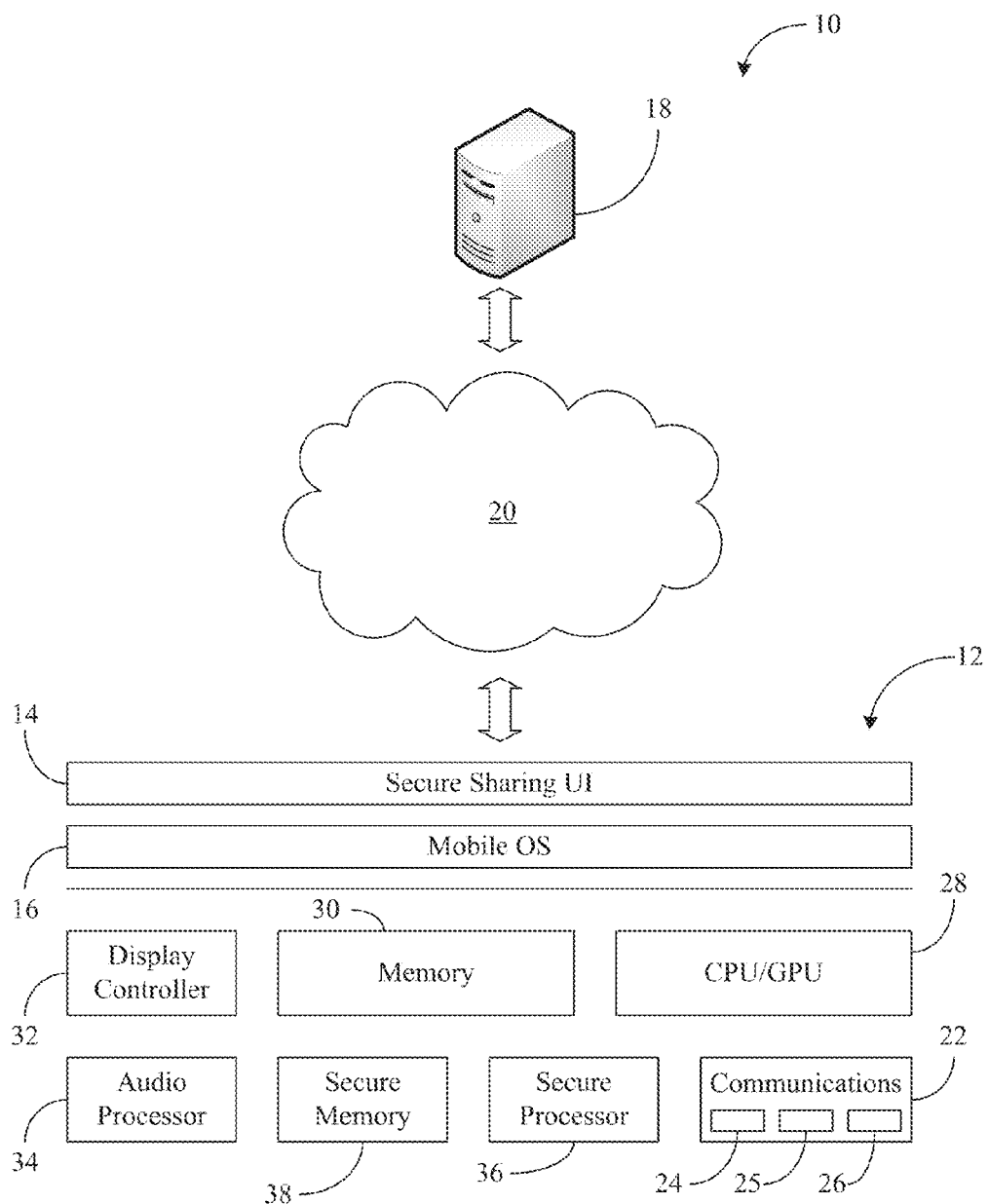
FIG. 1 is a block diagram of an example of a secure sharing architecture according to an embodiment.

Turning now to FIG. 1, a secure sharing architecture 10 is shown. Generally, a device 12 may be configured for secure sharing among individuals while enabling the usage of the device 12 to be tracked for billing purposes. In the illustrated example, a secure sharing UI (user interface) 14 and a mobile OS (operating system) 16 are implemented in software and/or firmware of the device, wherein the secure sharing UI 14 and mobile OS 16 facilitate communication with one or more servers 18 associated with a cloud service 20. More particularly, the device 12 may include a communications module 22 having a voice communications interface 24, an NFC (near field communications) interface 25, and a data communications interface 26, wherein the communications module 22 may provide the device 12 with telephone (e.g., phone) functionality such as a wireless smart phone, cellular phone, mobile Internet device (MID), smart tablet functionality, and so forth. For example, the communications module 22 could provide off-platform communication functionality for a wide variety of purposes such as, for example, cellular telephone (e.g., 3G, 4G, etc.), Wi-Fi (Wireless Fidelity, e.g., Institute of Electrical and Electronics Engineers/IEEE 802.11-2007), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony purposes. Moreover, the NFC interface 25 may enable communications with other devices and/or items such as an external card (not shown) that is brought into close proximity with the device 12, as will be discussed in greater detail.

Although the illustrated device 12 is configured as a mobile communications device, the device 12 may also be implemented as a landline phone (e.g., payphone), wired or wireless computing platform, etc. The device 12 may also include various hardware components such as a CPU/GPU (central processing unit/graphics processing unit) 28, memory 30, display controller 32, and audio processor 34 that support user interface, processing and/or communication functions for the device 12. In one example, the mobile OS 16 executes on the CPU/GPU 28 in a potentially vulnerable state from a security and/or hacking standpoint.

As will be discussed in greater detail, the illustrated device 12 also includes a secure processing element 36 and a secure memory element 38 that are used to implement logic to authenticate users of the device 12, transfer and process sensitive information, track the usage of the device 12, and so forth. For example, the secure memory element 38 may store account information, login information, encryption information, etc., wherein the secure processing element 36 and secure memory element 38 may be used to validate borrowers as well as the owner of the device 12, to validate billing selections based on fee based policies, to store usage information, and to transfer the usage information to the servers 18 associated with the cloud service 20. By performing these functions in secure components of the device 12, the illustrated architecture 10 significantly reduces the risk of unauthorized use of the device 12 and provides an enhanced user experience through a more robust set of billing options.

Figure 2:
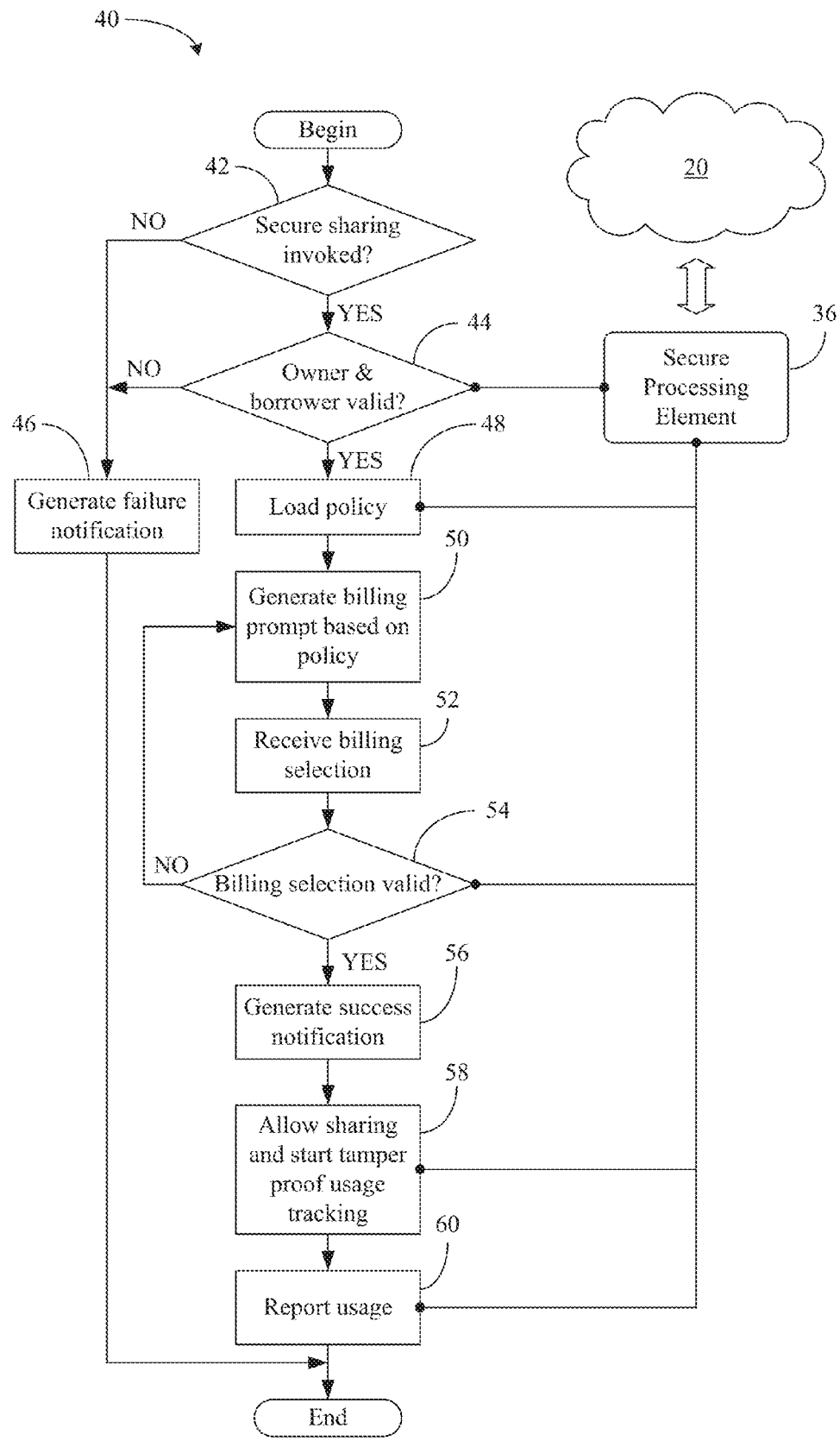
FIG. 2 is a flowchart of an example of a method of operating a device according to an embodiment.

FIG. 2 shows a method 40 of operating a device such as a mobile phone. The method 40 may be implemented as a set of executable logic instructions stored in at least one machine- or computer-readable storage medium such as random access memory (RAM), read only memory (ROM), programmable ROM (PROM), flash memory, firmware, microcode, etc., in configurable logic such as, for example, programmable logic arrays (PLAs), field programmable gate arrays (FPGAs), complex programmable logic devices (CPLDs), in fixed-functionality hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 40 may be written in any combination of one or more programming languages, including an object oriented programming language such as C++ or the like and conventional procedural programming languages, such as the "C" programming language or similar programming languages. Moreover, various aspects of the method 40 could be implemented as embedded logic of a processor such as the secure processing element 36 using any of the aforementioned circuit technologies.

Illustrated processing block 42 determines whether secure sharing has been invoked. Thus, block 42 may involve determining whether a request to share the device has been received via an interface such as, for example, the secure sharing UI 14 (FIG. 1), already discussed. If so, a determination may be made at block 44 as to whether the owner and borrower of the device are valid users. For example, the borrower of the device may have an external card with NFC functionality, wherein tapping the external card against the device may constitute a "proximity event" that triggers the wireless transfer of borrower information (e.g., account number, user identifier) from the external card to the device. In such a case, the secure processing element 36 may be configured to authenticate the external card by validating the borrower information obtained from the card. The validation process may involve communicating with the cloud service 20 in a secure fashion (e.g., using encryption information retrieved from a secure memory element). Moreover, the owner of the device may be authenticated by, for example, generating a user prompt, receiving user input in response to the prompt, retrieving owner information (e.g., user identifier, password, PIN/personal identification number) from the secure memory element, and comparing the user input to the owner information. If secure sharing has not been invoked, authentication of the external card has been unsuccessful, or authentication of the owner has been unsuccessful, illustrated block 46 generates a failure notification to the user and/or cloud service 20.

If secure sharing has been invoked and the authentications are successful, illustrated block 48 provides for loading a fee based policy to the secure processing element 36, wherein the policy may be loaded from the cloud service 20, a secure memory element such as the memory element 38 (FIG. 1), etc. The policy may indicate, for example, an option to conduct a funds transfer from the borrower to a service provider based on the borrower's usage of the device. Thus, the service provider (e.g., Verizon Wireless, AT&T) associated with the device might receive funds to cover the usage of the device from the borrower rather than the owner of the device in such a scenario. The policy may also indicate, for example, an option to conduct a funds transfer from the borrower to the owner of the device. Therefore, the owner may be compensated directly by the borrower for the borrower's usage of the device in such a scenario.

Additionally, the policy may indicate an option to conduct a minutes transfer from the borrower to the owner of the device. For example, the owner may have his or her minutes allowance (e.g., four hundred peak minutes of voice usage per month) increased by the number of minutes used by the borrower, whereas the borrower may have his or her minutes allowance decreased by that amount. Moreover, the policy may indicate an option to transfer a byte allowance from the borrower of the device to the owner of the device based on the borrower's usage of the device. For example, the owner may have his or her byte allowance (e.g., 10 GB of data usage per month) increased by the amount of data transferred to or from the device by the borrower, whereas the borrower may have his or her byte allowance decreased by that amount. In addition, the policy may indicate a minutes deduction from the borrower of the device. Thus, such an option may enable the owner's minutes to remain unchanged, whereas the borrower's minutes are reduced to reflect his or her usage of the device. Other options and/or combinations of options may also be implemented via the fee based policy. Moreover, the available options may be a function of the device owner's account/subscription, the borrower's account/subscription, etc., or any combination thereof.

Block 50 provides for generating a billing prompt based on the loaded policy, wherein the prompt may present (e.g., via display, audio component) the user and/or borrower with one or more options, as already discussed. A billing selection of one or more of the options may be received at block 52, wherein the billing selection may reflect a proposed agreement between the owner and the borrower (e.g., borrower agrees to transfer minutes to the owner). A determination may be made at block 54 as to whether the billing selection is valid. Block 54 may therefore involve using the secure processing element 36 to communicate with the cloud service 20. For example, it might be determined that the borrower has already exceeded his or her minutes allowance for the month. In such a case, the billing selection may be deemed invalid, wherein the billing prompt and selection validation processes may be repeated.

If the billing selection is valid, illustrated block 56 generates a success notification accordingly. Successful validation of the billing selection may also trigger a download of the borrower's address book, history and other customization information from the cloud service 20. Moreover, block 58 may provide for allowing the device to be shared and starting tamper proof usage tracking on the device. For example, block 58 may involve generating a timestamp and storing the timestamp to a secure memory element such as the memory element 38 (FIG. 1). Other usage tracking techniques such as data upload and/or download logging (e.g., for byte usage) may also be deployed. The tracked usage may be reported to a billing component in the cloud service 20 (e.g., billing service) at block 60, wherein the reporting may be on a periodic basis, in response to a sharing termination request, and so forth. Periodic usage reporting may be particularly advantageous with regard to preventing usages that exceed certain limits (e.g., borrowers minutes allowance, byte allowance, credit balance).

Techniques described herein may therefore enable smart phones to be shared among users in a secure fashion, while obviating any concerns that may exist with regard to payment for services used. For example, a first user (e.g., device owner) may loan his or her device to a second user (e.g., device borrower), wherein the device borrower may make a call and pay for the call via the borrower's account with the service provider (e.g., either directly to the service provider or indirectly via credit transfer from the borrower's account to the owner's account). Moreover, NFC technology may be used to provide non-phone enabled items such as cards with "virtual phone" capability (e.g., user identifier, virtual phone identifier, virtual phone account identifier). Additionally, the virtual phone card may be used at payphones instead of using credit cards, without concern over security. Indeed, device owners may use techniques described herein to generate revenue, particularly in settings where service coverage is limited. For example, an individual whose phone does not receive service may pay or otherwise compensate another individual whose phone does receive service to make calls and/or transfer data/files. In another example, an individual whose phone only receives roaming service may compensate another individual whose phone receives local service to make calls and/or transfer data/files. Indeed, the same may be true for other scenarios such as phones without sufficiently charged batteries, lost phones, stolen phones, etc.

Embodiments may therefore include a method of operating a device in which an authentication is conducted of an external card associated with a borrower of the device. The method may also provide for tracking a usage of the device by the borrower if the authentication of the external card is successful. In addition, the usage may be reported to a billing service.

Moreover, conducting the authentication of the external card may include identifying a proximity event with respect to the external card and the device, obtaining borrower information from the external card in response to the proximity event, and validating the borrower information.

Additionally, validating the borrower information may include using a secure processing element of the device to transmit the borrower information to a cloud service.

In addition, the proximity event may be a near field communications event.

In addition, the method may further include loading a policy to a secure processing element of the device if the authentication of the external card is successful, generating a billing prompt based on the policy, receiving a billing selection, and validating the billing selection, wherein the usage of the device by the borrower is tracked if the billing selection is valid.

Additionally, the policy may indicate one or more of a funds transfer from the borrower to a service provider, a funds transfer from the borrower to an owner of the device, a minutes transfer from the borrower to an owner of the device, a byte allowance from the borrower to the owner of the device, and a minutes deduction from the borrower of the device.

Moreover, the policy may be loaded from one or more of a secure memory element of the device and a cloud service.

Moreover, the method may further include receiving customization information from the cloud service if the authentication of the external card is successful and the billing information is valid, wherein the customization information is associated with the borrower.

Additionally, the method may further include conducting an authentication of an owner of the device, wherein the usage of the device is tracked if the authentication of the owner is successful and the authentication of the external card is successful.

In addition, the method may further include generating a success notification if the authentication of the owner is successful and the authentication of the external card is successful, and generating a failure notification if the authentication of the owner is not successful or the authentication of the external card is not successful.

In addition, conducting the authentication of the owner may include generating a user prompt, receiving user input, retrieving owner information from a secure memory element of the device, and comparing the user input to the owner information.

Embodiments may also include a method of operating a device in which a proximity event is identified with respect to the device and an external card. The method may also provide for obtaining borrower information from the external card in response to the proximity event, and validating the borrower information to conduct an authentication of the external card. Validating the borrower information may include using a secure processing element of the device to transmit the borrower information to a cloud service. In addition, the method may provide for loading a policy to the secure processing element if the authentication of the external card is successful, wherein the policy indicates one or more of a funds transfer from a borrower to a service provider, a funds transfer from the borrower to an owner of the device, a minutes transfer from the borrower to the owner of the device, a byte allowance transfer from the borrower to the owner of the device, and a minutes deduction from the borrower of the device. Moreover, the policy may be loaded from one or more of a secure memory element of the device and the cloud service. Additionally, the method may involve generating a billing prompt based on the policy, receiving a billing selection, and validating the billing selection. In addition, the method may provide for receiving customization from the cloud service if the authentication of the external card is successful and the billing information is valid, wherein the customization information is associated with the borrower. The method may also include tracking a usage of the device by the borrower if the authentication of the external card is successful and the billing selection is valid, and reporting the usage to a billing service.

Moreover, the proximity event may be a near field communications event.

In addition, the method may further include conducting an authentication of the owner of the device, wherein the usage of the device is tracked if the authentication of the owner is successful, the authentication of the external card is successful, and the billing selection is valid.

Additionally, the method may further provide for generating a success notification if the authentication of the owner is successful, the authentication of the external is successful, and the billing selection is valid, and generating a failure notification if the authentication of the owner is not successful, the authentication of the external card is not successful, or the billing selection is not valid.

Additionally, conducting the authentication of the owner may include generating a user prompt, receiving user input, retrieving owner information from the secure memory element of the device, and comparing the user input to the owner information.

Embodiments may also include at least one machine readable medium having a plurality of instructions that in response to being executed on a device, cause the device to carry out any of the aforementioned methods.

Embodiments may also include a device arranged to perform a method according to any of the aforementioned methods.

Other embodiments may include a device having a voice communications interface, a data communications interface, and a card authentication module to conduct an authentication of an external card associated with a borrower of the device. The device may also include a usage module to track a usage of the device by the borrower if the authentication of the external card is successful, and a fee module to report the usage to a billing service.

In one example, the device further includes a secure processing element, and a policy module to load a policy to the secure processing element if the authentication of the external card is successful, generate a billing prompt based on the policy, receive a billing selection, and validate the billing selection, wherein the usage of the device by the borrower is to be tracked if the billing selection is valid.

The device may also include an owner authentication module to conduct an authentication of an owner of the device, wherein the usage of the device is to be tracked if the authentication of the owner is successful and the authentication of the external card is successful.

Certain aspects of embodiments of the present invention may be implemented using hardware, software, or a combination thereof and may be implemented in one or more computer systems or other processing systems. Program code may be applied to the data entered using an input device to perform the functions described and to generate output information. The output information may be applied to one or more output devices. One of ordinary skill in the art may appreciate that embodiments may be practiced with various computer system configurations, including multi-processor systems, minicomputers, mainframe computers, and the like. Embodiments may also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be functional, compiled or interpreted.

Program instructions may be used to cause a general-purpose or special-purpose processing system that is programmed with the instructions to perform the methods described herein. Alternatively, the methods may be performed by specific hardware components that contain hardwired logic for performing the methods, or by any combination of programmed computer components and custom hardware components. The methods described herein may be provided as a computer program product that may include at least one machine readable medium having stored thereon instructions that may be used to program a processing system or other electronic device to perform the methods. The term "machine readable medium" or "machine accessible medium" used herein shall include any medium that is capable of storing or encoding a sequence of instructions for execution by the machine and that causes the machine to perform any one of the methods described herein. The terms "machine readable medium" and "machine accessible medium" may accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

We claim:

1. A method comprising;
   identifying a proximity event with respect to a device and an external card, wherein the proximity event is a near field communications event;
   obtaining borrower information from the external card in response to the proximity event;
   validating the borrower information to conduct an authentication of the external card, wherein validating the borrowing information includes using a secure processing element of the device to transmit the borrower information to a cloud service;
   loading a policy to the secure processing element when if the authentication of the external card is successful, wherein the policy indicates one or more of a funds transfer from a borrower to a service provider, a funds transfer from the borrower to an owner of the device, a minutes transfer from the borrower to the owner of the device, a byte allowance transfer from the borrower to the owner of the device, and a minutes deduction from the borrower of the device, and wherein the policy is loaded from one or more of a secure memory element of the device and the cloud service;
   generating a billing prompt based on the policy;
   receiving a billing selection;
   validating the billing selection;
   receiving customization information from the cloud service when the authentication of the external card is successful and the billing information is valid, wherein the customization information is information associated with the borrower including a borrower address book or borrower history;
   conducting an authentication of the owner of the device, wherein the usage of the device is tracked when the authentication of the owner is successful, the authentication of the external card is successful, and the billing selection is valid, and wherein conducting the authentication of the owner includes generating a user prompt, receiving user input, retrieving owner information from the secure memory element of the device, and comparing the user input to the owner information;
   tracking a usage of the device by the borrower when the authentication of the external card is successful and the billing selection is valid; and
   reporting the usage to a billing service.

2. The method of claim 1, further including:
   generating a success notification when the authentication of the owner is successful, the authentication of the external card is successful, and the billing selection is valid; and
   generating a failure notification when the authentication of the owner is not successful, the authentication of the external card is not successful, or the billing selection is not valid.

3. At least one non-transitory machine readable medium comprising a set of instructions which, when executed by a processor, cause a device to:
   identify a proximity event with respect to the device and an external card, wherein the proximity event is a near field communications event;
   obtain borrower information from the external card in response to the proximity event;
   validate the borrower information to conduct an authentication of the external card, wherein validating the borrowing information includes using a secure processing element of the device to transmit the borrower information to a cloud service;
   load a policy to the secure processing element when the authentication of the external card is successful, wherein the policy indicates one or more of a funds transfer from a borrower to a service provider, a funds transfer from the borrower to an owner of the device, a minutes transfer from the borrower to the owner of the device, a byte allowance transfer from the borrower to the owner of the device, or a minutes deduction from the borrower of the device, and wherein the policy is loaded from one or more of a secure memory element of the device or the cloud service;
   generate a billing prompt based on the policy;
   receive a billing selection;
   validate the billing selection;
   receive customization information from the cloud service when the authentication of the external card is successful and the billing information is valid, wherein the customization information is information associated with the borrower including a borrower address book or a borrower history;

conduct an authentication of the owner of the device, wherein the usage of the device is tracked when the authentication of the owner is successful, the authentication of the external card is successful, and the billing selection is valid, wherein conducting the authentication of the owner includes generating a user prompt, receiving user input, retrieving owner information from the secure memory element of the device, and comparing the user input to the owner information;

track a usage of the device by the borrower when the authentication of the external card is successful and the billing selection is valid; and report the usage to a billing service.

4. The medium of claim 3, wherein the instructions, when executed, cause the device to:

generate a success notification when the authentication of the owner is successful, the authentication of the external card is successful, and the billing selection is valid; and generate a failure notification when the authentication of the owner is not successful, the authentication of the external card is not successful, or the billing selection is not valid.

\* \* \* \* \*